United States Patent
Levy et al.

(10) Patent No.: US 11,206,620 B2
(45) Date of Patent: Dec. 21, 2021

(54) BEAM GAIN SIGNALING

(71) Applicant: QUALCOMM Incorporated, San Diego, CA (US)

(72) Inventors: Sharon Levy, Binyamina (IL); Guy Wolf, Rosh Haayin (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/852,372

(22) Filed: Apr. 17, 2020

(65) Prior Publication Data
US 2021/0329564 A1 Oct. 21, 2021

(51) Int. Cl.
*H04W 52/22* (2009.01)
*H04W 52/24* (2009.01)
*H04W 72/04* (2009.01)
*H04W 16/28* (2009.01)

(52) U.S. Cl.
CPC ......... *H04W 52/242* (2013.01); *H04W 16/28* (2013.01); *H04W 72/042* (2013.01)

(58) Field of Classification Search
CPC . H04W 52/242; H04W 16/28; H04W 72/042; H04W 72/0413; H04W 72/0473; H04W 52/228; H04W 52/52
See application file for complete search history.

(56) References Cited

U.S. PATENT DOCUMENTS

| | | | |
|---|---|---|---|
| 6,173,162 B1 * | 1/2001 | Dahlman | H04B 7/2628 455/69 |
| 10,367,677 B2 * | 7/2019 | Parkvall | H04W 24/10 |
| 2014/0334320 A1 * | 11/2014 | Liu | H04L 5/0098 370/252 |
| 2015/0350928 A1 * | 12/2015 | Zhang | H04W 24/02 370/252 |
| 2016/0119901 A1 * | 4/2016 | Zhang | H04L 5/0094 370/329 |
| 2018/0131492 A1 | 5/2018 | Wilson et al. | |

(Continued)

FOREIGN PATENT DOCUMENTS

| | | | |
|---|---|---|---|
| CN | 112020132 A | * 12/2020 | |
| WO | 2019095299 A1 | 5/2019 | |
| WO | WO-2020199066 A1 | * 10/2020 | H04W 72/04 |

OTHER PUBLICATIONS

Lin X., "5G New Radio: unveiling the essentials of the next generation wireless access technology", 2018, pp. 1-8 (Year: 2018).*

(Continued)

*Primary Examiner* — Dong-Chang Shiue
(74) *Attorney, Agent, or Firm* — QUALCOMM Incorporated

(57) ABSTRACT

A base station transmits a first transmission using a first directional beam and determines an equivalent isotropic radiated power (EIRP) relationship between the first transmission and a physical downlink shared channel (PDSCH) for a user equipment (UE). The base station transmits, to the UE, an indication of the EIRP relationship between the first transmission and the PDSCH. Then, the base station transmits the PDSCH to the UE using the second directional beam. The UE uses the indication of the EIRP relationship to receive the PDSCH from the base station over the second directional beam.

14 Claims, 11 Drawing Sheets

(56) References Cited

U.S. PATENT DOCUMENTS

| | | |
|---|---|---|
| 2018/0288772 A1 | 10/2018 | Liu et al. |
| 2019/0044792 A1* | 2/2019 | Kwon .................. H04W 52/18 |
| 2019/0089436 A1* | 3/2019 | Wei ...................... H04L 5/0082 |
| 2019/0098585 A1* | 3/2019 | Golitschek Edler von Elbwart ... H04W 52/48 |
| 2019/0349863 A1* | 11/2019 | Lim .................... H04W 52/146 |
| 2019/0349901 A1* | 11/2019 | Basu Mallick ..... H04W 72/042 |
| 2019/0372630 A1* | 12/2019 | Brunel ................. H04B 7/0695 |
| 2020/0236555 A1* | 7/2020 | Tomeba ............ H04W 74/0808 |
| 2020/0275382 A1* | 8/2020 | Liu .................... H04W 52/242 |

OTHER PUBLICATIONS

Lin X., et al., "5G New Radio: Unveiling the Essentials of the Next Generation Wireless Access Technology", 2018, pp. 1-8.
International Search Report and Written Opinion—PCT/US2021/026819—ISA/EPO—dated Jul. 13, 2021.

* cited by examiner

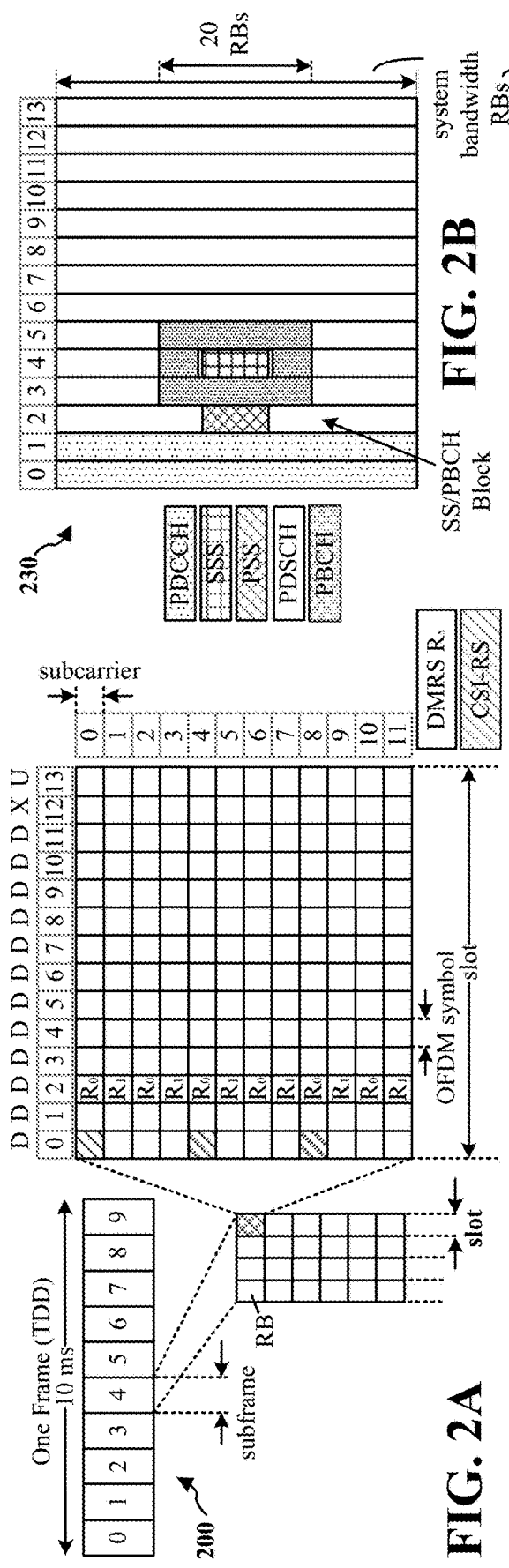
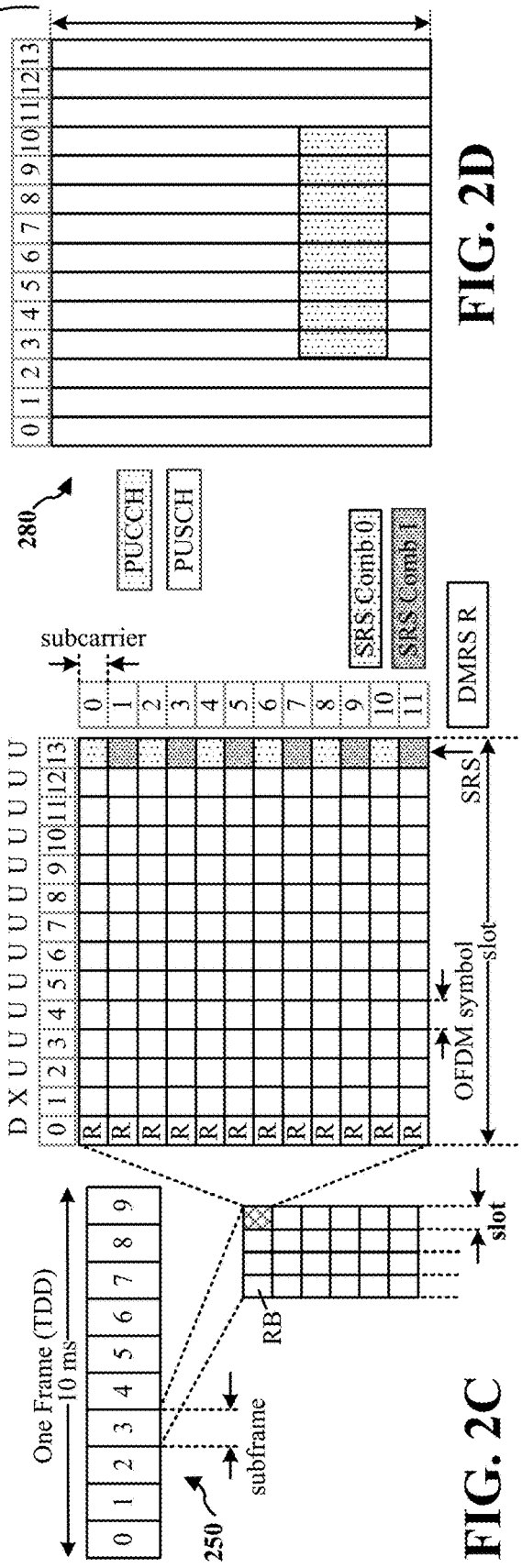
FIG. 2A
FIG. 2B
FIG. 2C
FIG. 2D

BEAM GAIN SIGNALING

TECHNICAL FIELD

The present disclosure relates generally to communication systems, and more particularly, to wireless communication including directional beams.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY OF SOME EXAMPLES

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. Some implementations may occur at a base station. In some apparatus implementations, the base station may transmit a first transmission using a first directional beam and determines an equivalent isotropic radiated power (EIRP) relationship between the first transmission and a physical downlink shared channel (PDSCH) for a user equipment (UE). The base station may then transmit, e.g., to the UE, an indication of the EIRP relationship between the first transmission and the PDSCH. Then, the base station may transmit the PDSCH, e.g., to the UE, using the second directional beam.

In another aspect of the disclosure, a method, a computer-readable medium, and an apparatus are provided for wireless communication. Some implementations may occur at a UE. In some apparatus implementations, the UE may receive a first transmission from a base station over a first directional beam. The UE may receive, from the base station, an indication of an EIRP relationship between the first transmission and a PDSCH and may receive the PDSCH from the base station over a second directional beam using the EIRP relationship.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
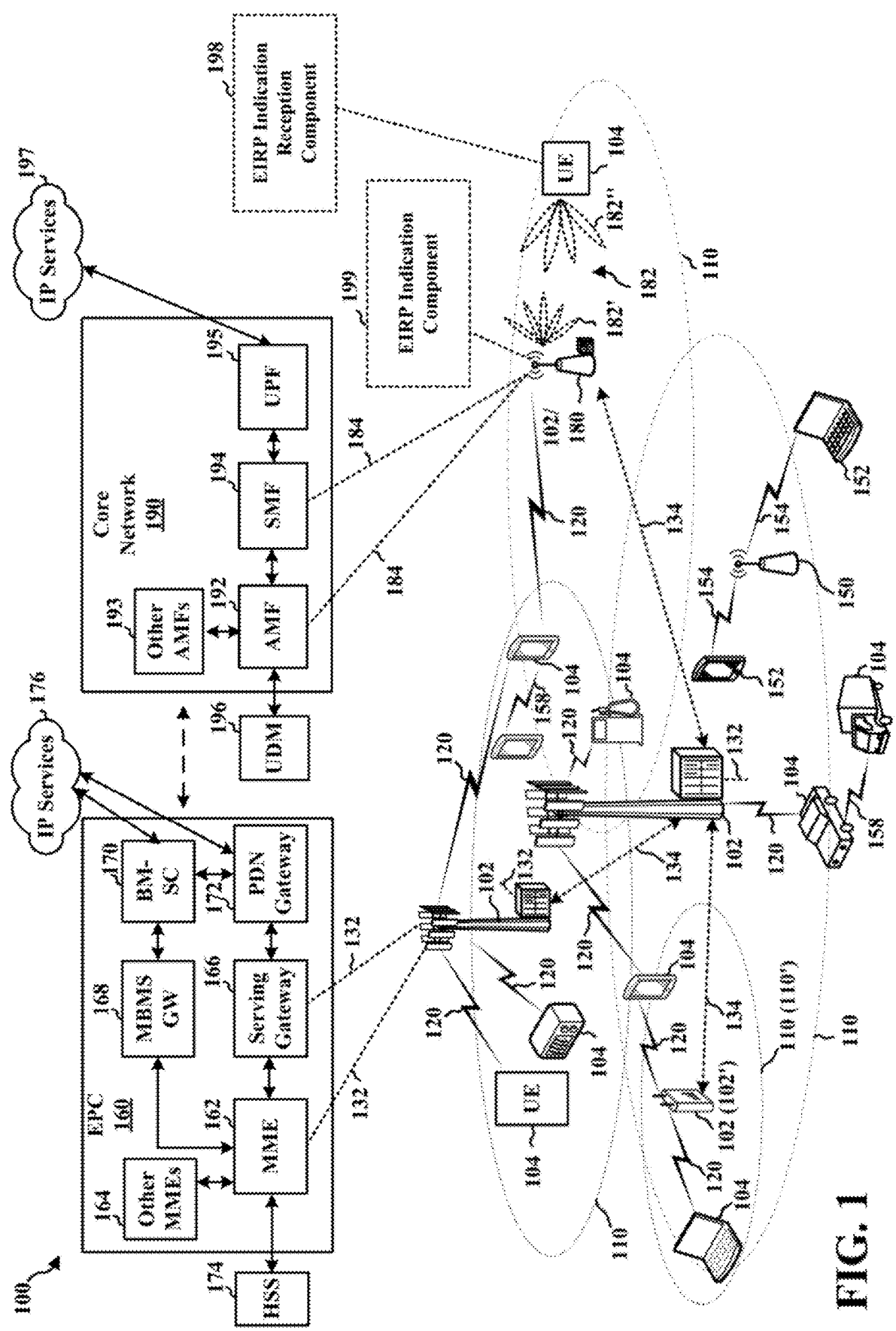
FIG. 1 is a diagram illustrating an example of a wireless communications system and an access network, according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The access network 100 may include one or more base stations 102 or 180 and one or more UEs 104. The base station base station 102/180 may utilize beamforming 182 with the UE 104, e.g., to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

Some physical channels, such as a channel comprising SSB, TRS, CSI-RS, etc., may be transmitted by a base station 102/180 using broader spatial beams, whereas data (e.g., a physical downlink shared channel) may be transmitted using a narrower beam to improve spectral efficiency. The difference in the beams may lead to a mismatch between the received power that the UE 104 observes on different channels. The power difference may lead to challenges for receiver control loops at the UE when there are beam changes at the base station 102/180.

Aspects presented herein improve automatic gain control convergence and/or channel estimation for the UE 104 through signaling from the base station 102/180 that indicates an EIRP relationship between a first downlink transmission and a PDSCH for the UE 104.

In some examples, a base station 102 or 180 may include an EIRP indication component 199 configured to determine an EIRP relationship between a first downlink transmission and a PDSCH for a UE 104. The EIRP indication component 198 may be configured to transmit, to the UE 104, an indication of the EIRP relationship between the first transmission and the PDSCH. Then, the base station 102 or 180 may transmit the PDSCH to the UE using the second directional beam. The UE 104 may include an EIRP indication reception component 198 configured to receive, from the base station 102 or 180, an indication of an EIRP relationship between the first transmission and a PDSCH. The EIRP indication reception component 198 may be configured to receive the PDSCH from the base station 102 or 180 over a second directional beam using the received EIRP relationship. For example, the UE 104 may perform automatic gain control to receive the PDSCH using the EIRP relationship indicated by the base station 102 or 180. In another example, the UE 104 may perform channel estimation to receive the PDSCH using the EIRP relationship indicated by the base station.

Although the following description may be focused on 5G NR, the concepts described herein may be applicable to other similar areas, such as LTE, LTE-A, CDMA, GSM, and other wireless technologies.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the base station 180 operates in mmW or near mmW frequencies, the base station 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, the term "sub-6 GHz" if used herein by way of example may represent all or part of FR1 for 5G NR. Further, unless specifically stated otherwise, the term "millimeter wave" as used herein by way of example may represent all or part of FR2 for 5G NR and/or all or part of a 30 GHz-300 GHz waveband.

The above examples are not necessarily intended to limit claimed subject matter. For example, unless specifically recited, claimed subject matter relating to wireless communications is not necessarily intended to be limited to any particular author/entity defined frequency band, or the like.

The mmW base station 180 may utilize beamforming 182 with the UE 104, as described above to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
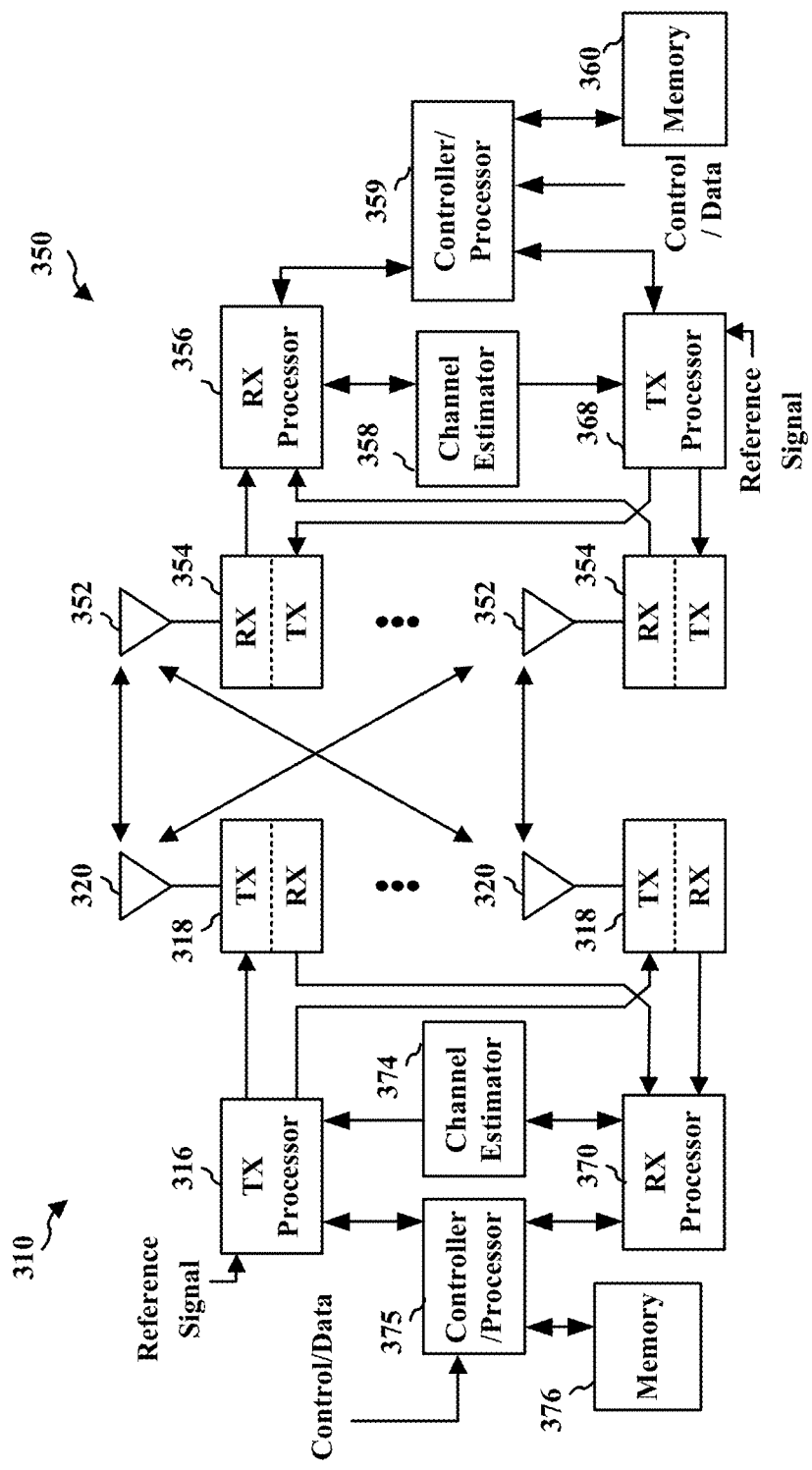
FIG. 3 is a diagram illustrating an example of a base station and UE in an access network, according to some aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

As described in connection with FIG. 1, wireless devices may use antenna arrays in order to transmit directional beams, e.g., for FR1. In some examples, a base station may use a large antenna array to transmit and/or receive communication with a UE using directional beams (e.g., 182' described in connection with FIG. 1) Analog beams may be used to exchange communication in FR2.

Figure 4:
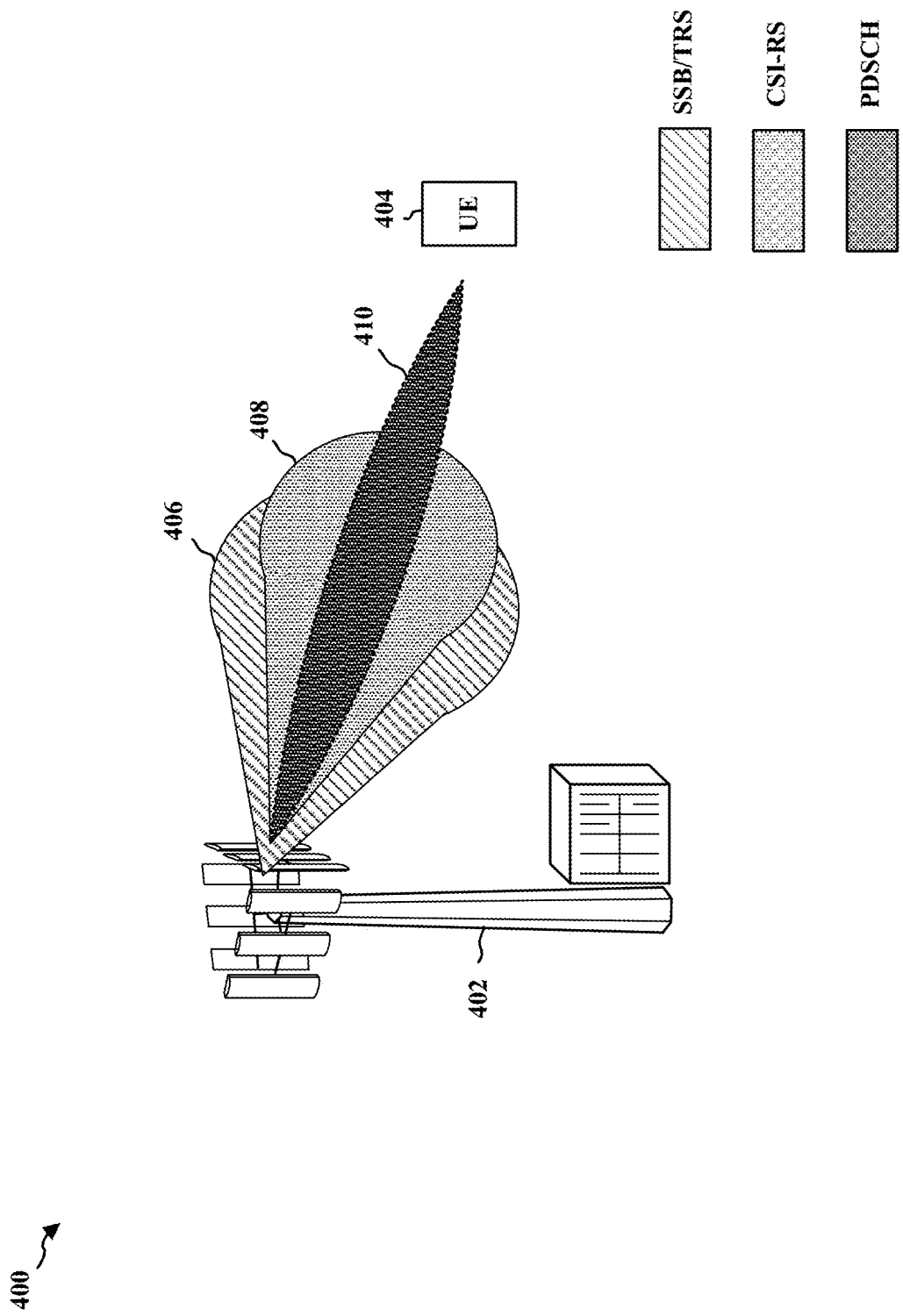
FIG. 4 illustrates a communication system including a base station and a UE that communicating using beamforming, according to some aspects of the present disclosure.

Common physical channels (such as a channel used to transmit CSI-RS, SSB, TRS, etc.) may be transmitted with broad spatial beams, whereas data (e.g., PDSCH) may be transmitted using a narrower, more concentrated beam, e.g., in order to increase spectral efficiency. A common physical channel may refer to a channel that is transmitted in common to more than one UE. FIG. 4 illustrates an example communication system 400 including a base station 402 and a UE 404. FIG. 4 illustrates a broader beam 406 used to transmit SSB/TRS than the beam 410 used to transmit PDSCH to the UE 404. As well, FIG. 4 illustrates a broader beam 408 used to transmit CSI-RS from the base station 402 as compared to the narrower beam 410 used to transmit the PDSCH to the UE 404.

The difference between the beam used for downlink transmissions may lead to a mismatch (or difference) between the received power that the UE 404 observes on different channels. For example, the UE may receive the SSB/TRS having a different received power than the PDSCH in FIG. 4. Similarly, the UE may receive the CSI-RS in FIG. 4 with a different received power than the PDSCH.

The power difference may create a challenge for the receiver control loops at the UE 404. For example, the automatic gain control (AGC), channel estimation, and/or demodulation reference signal (DMRS) estimation parameters (including delay spread, etc.) may be affected by the power difference between the different downlink transmissions and may reduce reception performance for the UE. The base station 402 may dynamically change the beam used to transmit PDSCH, and the effect may be increased when the base station 402 performs rapid changes of the beam order used for downlink transmissions. The base station 402 may also dynamically change the transmission power used to transmit downlink signals that are received by the UE 404.

As an example, AGC may use a history of reception information at the UE to receive the PDSCH. However, such AGC may rely on a pilot signal and a data signal having similar behavior. AGC may be inaccurate when a downlink signal on a beam, such as beam 406 or 408, is used to receive PDSCH on beam 410.

The UE 404 may rely on measurements of the beam imbalance, e.g., between the beam 410 and the beam 406 and/or the beam 408, to receive the PDSCH. However, the use of beam imbalance measurements may suffer from instability in transient use cases, e.g., when the base station changes beams, when the UE wakes up, etc.

In order to overcome the instability, the UE may consider the number of configured ports as an initial EIRP offset value. However, such an initial EIRP value may be relevant to the CSI-RS but not to other signals or other channels. The base station may dynamically change transmission power between different downlink transmissions. As an example, the UE may be aware of a transmission power difference between CSI-RS and PDSCH transmissions. The UE may provide feedback about the CSI-RS that is used by the base station 402 to determine precoding, spectral efficiency, etc. in connection with a PDSCH transmission for the UE 404. The SSB or the TRS transmitted by the base station 502 may have a wider beam than the CSI-RS ports so that the gain may be much higher. The higher gain may lead to errors in receiving the PDSCH signal. Even with periodic CSI-RS, the maximum beam gain could lead to throughput limitations due to an AGC noise floor.

Figure 5:
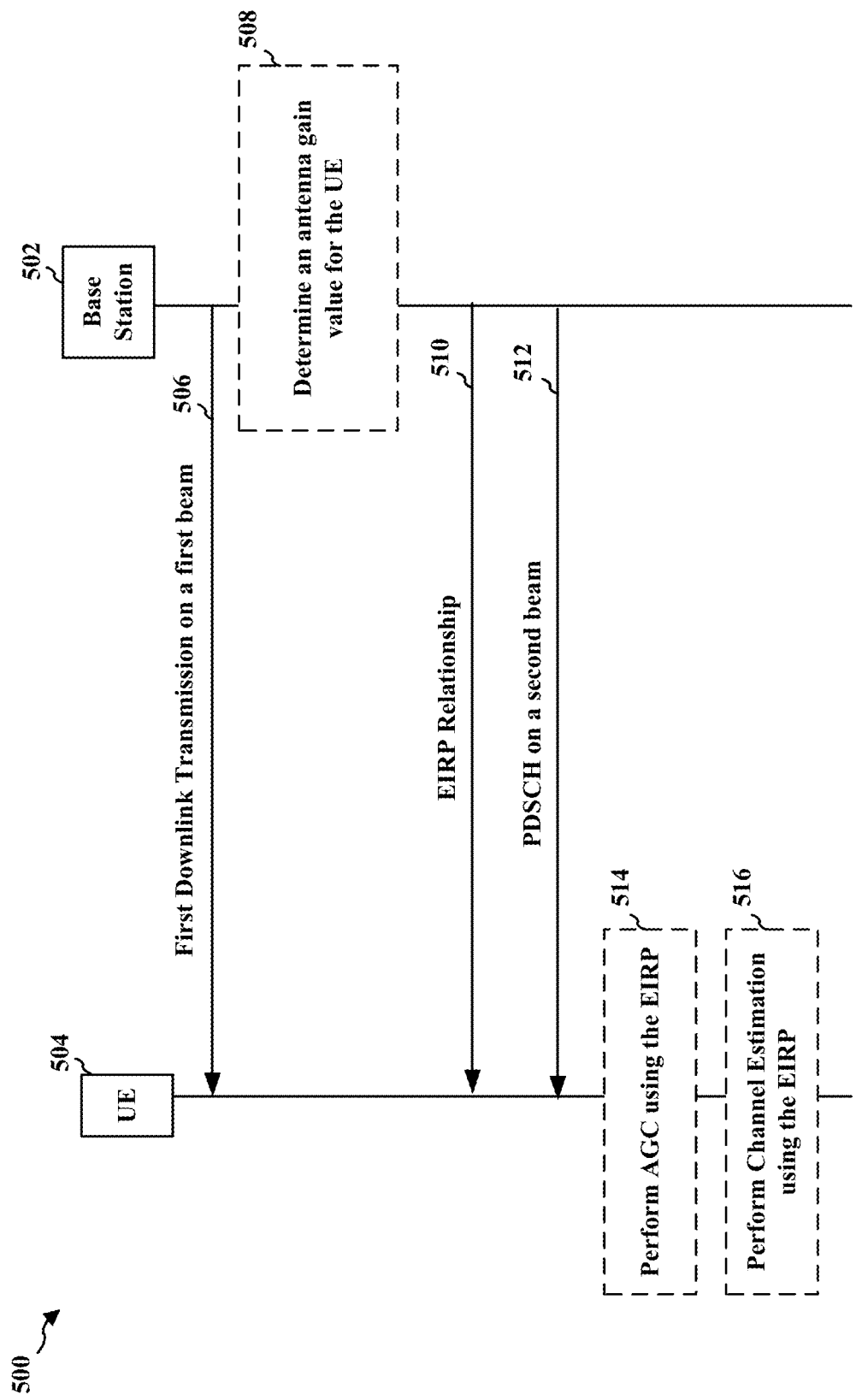
FIG. 5 is an example communication flow between a base station and a UE including signaling regarding an EIRP relationship between a first downlink transmission and a PDSCH for the UE, according to some aspects of the present disclosure.

In order to improve PDSCH reception at the UE 404, aspects presented herein provide for signaling from the base station to the UE that indicates an expected EIRP power ratio between a first downlink transmission and a PDSCH transmission for the UE. FIG. 5 illustrates an example communication flow 500 between a base station 502 and a UE 504 that includes signaling a EIRP relationship information to the UE 504 that enables the UE 504 to better receive a PDSCH from the base station 502.

The base station 502 may transmit a first downlink transmission 506 to the UE using a first spatial direction (e.g., a first beam). The first transmission 506 may comprise an SSB. The first transmission 506 may comprise a TRS. The first transmission 506 may comprise a CSI-RS. The first transmission 506 may comprise a first PDSCH.

At 510, the base station 502 transmits an indication 510 of an EIRP relationship between the first transmission 506 and a PDSCH 512 to the UE 504. Prior to transmitting the indication 510, the base station 502 determines an EIRP relationship between the first transmission 506 and the PDSCH 512. The base station 502 may determine an antenna gain value for the UE 504 for reception of the PDSCH, at 508.

The EIRP relationship, indicated at 510, may be determined based, at least in part, on the antenna gain value of the base station (e.g., the antenna gain for the base station used for the transmission for the UE). For example, the EIRP relationship may be determined based on the antenna gain value, a first transmission power for the first transmission, and a second transmission power for the PDSCH. The base station 502 may determine the antenna gain value based on a precoding selected for the PDSCH. The base station 502 may determine the antenna gain value based on an antenna beam pattern used in a transmission for the UE 504. The base station 502 may determine the antenna gain value based on uplink channel measurements for communication from the UE 504. The base station 502 may determine the antenna gain value based on an estimated pathloss for the UE 504. The base station 502 may determine the antenna gain value based on a combination of precoding, antenna beam pattern, uplink channel measurements, and/or estimated pathloss.

For example, the base station 502 may indicate an EIRP relationship between an SSB and a PDSCH for the UE. As another example, the base station may indicate an EIRP relationship between a CSI-RS and a PDSCH for the UE. As another example, the base station may indicate an EIRP relationship between a TRS and a PDSCH for the UE. In another example, the base station may signal a change in an EIRP relative to a previous PDSCH transmission (e.g., an EIRP power ratio between the PDSCH transmission and a previous PDSCH transmission). The EIRP relationship between the two signals may be based on a combination of a transmission power ratio between the two signals (e.g., a "power offset" between the two downlink signals) and an antenna gain for the downlink transmission of the PDSCH 512 to the UE 504. The EIRP may take into consideration the base station's antenna beam pattern and the selected precoding for the signals. A nominal power offset may be used between beams, e.g., between the SSB and the PDSCH or between the CSI-RS and the PDSCH. A maximum power offset may be used between beams, e.g., between the SSB and the PDSCH or between the CSI-RS and the PDSCH. As an example, the base station 502 may indicate a nominal EIRP relationship between the first transmission 506 and the PDSCH 512. The base station 502 may indicate a maximum EIRP relationship between the first transmission 506 and the PDSCH 512.

The base station 502 may transmit the indication 510 to the UE in any of a number of ways. The base station 502 may signal the power offset/power ratio to the UE 504 in DCI, such as including it in the TCI state for the PDSCH. Alternately, the base station 502 may signal the power offset/power ratio to the UE 504 in RRC signaling, e.g., such as signaling maximum EIPR values. In another example, the base station 502 may signal the EIRP relationship to the UE 504 using a combination of RRC signaling and DCI. For example, the DCI may dynamically indicate an actual EIRP relationship with reference to an index or other parameter indicated in RRC signaling. In another example, the base station 502 may signal the power offset/power ratio to the UE 504 as part of the data payload in an earlier PDSCH 512. For example, the indication 510 may indicate that the EIRP relationship applies to the PDSCH 512 and future PDSCH. The indication may indicate a time, or a time offset, from which the EIRP relationship applies to PDSCH transmissions for the UE 504, because AGC parameters may already be set for the current PDSCH 512. Thus, the EIRP relationship may provide information that the UE 504 uses to decode data in a next slot.

As illustrated at 512, the base station 502 transmits the PDSCH to the UE 504 using a second directional beam (e.g., a second spatial direction). The second directional beam may be different than the first directional beam. As illustrated in FIG. 4, the second directional beam may be wider than a first directional beam. For example, the base station 502 may transmit the first transmission 506 and the PDSCH 512 in FR1, and the first directional beam may be wider than the second directional beam, e.g., as illustrated in FIG. 4.

In an example, the first transmission 506 may comprise an SSB, and the EIRP relationship indicated at 510 may include an EIRP ratio between the SSB and the PDSCH 512 and/or an EIRP offset between the SSB and the PDSCH 512.

In another example, the first transmission 506 may comprise a TRS, and the EIRP relationship indicated at 510 may include an EIRP ratio between the TRS and the PDSCH 512 or an EIRP offset between the TRS and the PDSCH 512.

In another example, the first transmission 506 may comprise a prior PDSCH transmission, and the EIRP relationship indicated at 510 may include an EIRP ratio between the prior PDSCH transmission and the PDSCH 512 or an EIRP offset between the prior PDSCH transmission and the PDSCH 512. In this case the EIRP signaling 510 could be part of the PDSCH payload. Thus, although the indication 510 of the EIRP relationship is illustrated with a separate line than the first downlink transmission 506 (e.g., PDSCH), in some examples, the indication 510 may be comprised in, or otherwise transmitted together with, the first downlink transmission 506 (e.g., in a prior PDSCH).

In another example, the first transmission 506 may comprise a CSI-RS, and the EIRP relationship may include an EIRP ratio between the CSI-RS and the PDSCH 512 or an EIRP offset between the CSI-RS and the PDSCH 512.

The UE 504 may use the indication 510 of the EIRP relationship to receive the PDSCH 512. As an example, as illustrated at 514, the UE 504 may perform automatic gain control to receive the PDSCH 512 using the EIRP relationship indicated by the base station 502. As another example, as illustrated at 516, the UE 504 may perform channel estimation to receive the PDSCH 512 using the EIRP relationship indicated by the base station 502.

Figure 6:
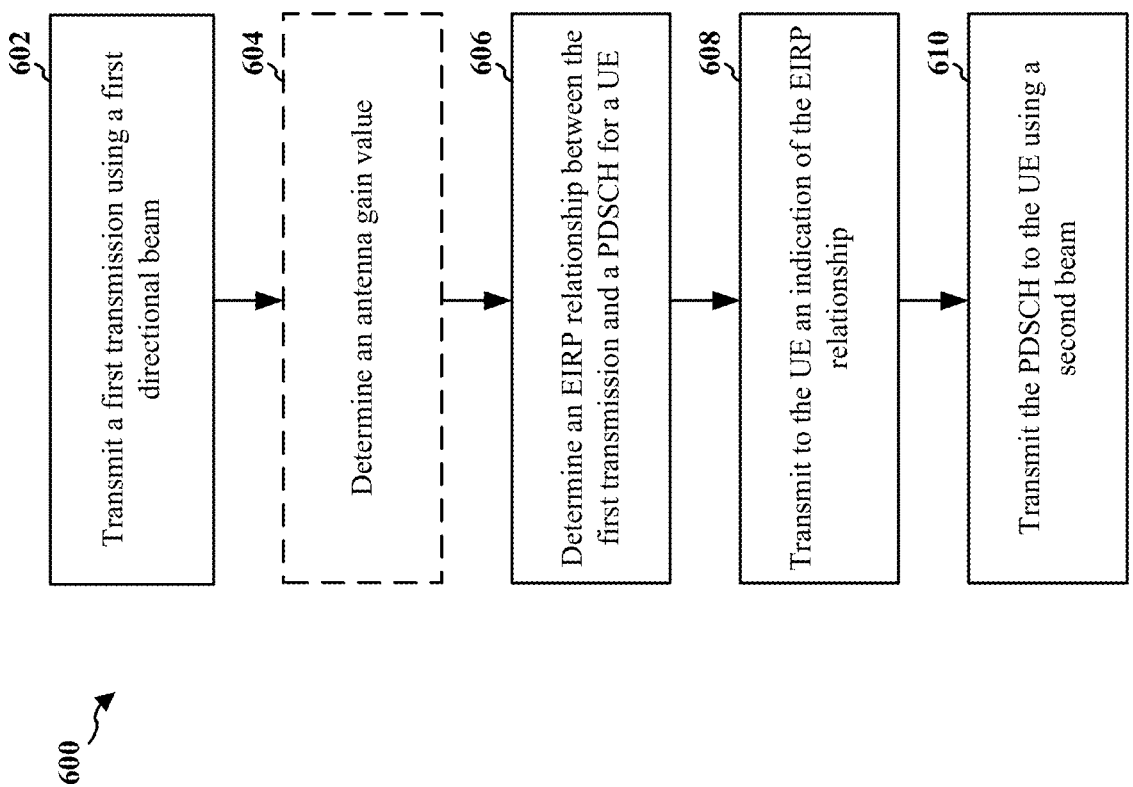
FIG. 6 is a flowchart of a method of wireless communication at a base station including signaling regarding an EIRP relationship between a first downlink transmission and a PDSCH for the UE, according to some aspects of the present disclosure.

FIG. 6 is a flowchart 600 of a method of wireless communication. The method may be performed by a base station or a component of a base station (e.g., the base station 102, 180, 310, 402, 502; the apparatus 702/702'; the processing system 814, which may include the memory 376 and which may be the entire base station 310 or a component of the base station 310, such as the TX processor 316, the RX processor 370, and/or the controller/processor 375). Optional aspects are illustrated with a dashed line. The method may help the base station to assist the UE in receive PDSCH.

At 602, the base station transmits a first transmission using a first directional beam. The first transmission may correspond, e.g., to the first downlink transmission 506 in FIG. 5. The first transmission may include an SSB. The first transmission may include a TRS. The first transmission may include CSI-RS. The first transmission may include a first PDSCH. The first transmission may use a different beam that a PDSCH transmission, e.g., as described in connection with FIG. 4.

At 606, the base station determines an EIRP relationship between the first transmission and a PDSCH for a UE. The EIRP relationship may include a dynamic EIRP ratio between the first transmission and the PDSCH that is indicated in DCI. The EIRP relationship may include a dynamic EIRP ratio between the first transmission and the PDSCH that is indicated in a payload of a previous PDSCH. For example, the EIRP relationship may indicate that starting from a time or from a time offset, that the base station will change the EIRP ratio to the indicated value for PDSCH transmission. The EIRP relationship may include a maximum EIRP ratio between the first transmission and the PDSCH or a maximum EIRP offset between the first transmission and the PDSCH. The EIRP relationship may be indicated to the UE in a RRC message.

As illustrated at 604, the base station may determine an antenna gain value for the transmission of the PDSCH to the UE. The EIRP relationship may be determined at 606 based, at least in part, on the antenna gain value of the base station (e.g., the antenna gain for the base station used for the transmission for the UE). For example, the EIRP relationship may be determined based on the antenna gain value, a first transmission power for the first transmission, and a second transmission power for the PDSCH. The base station may determine the antenna gain value based on a precoding selected for the PDSCH. The base station may determine the antenna gain value based on an antenna beam pattern used in a transmission for the UE. The base station may determine the antenna gain value based on uplink channel measurements for communication from the UE. The base station may determine the antenna gain value based on an estimated pathloss for the UE. The base station may determine the antenna gain value based on a combination of precoding, antenna beam pattern, uplink channel measurements, and/or estimated pathloss.

At 608, the base station transmits, to the UE, an indication of the EIRP relationship between the first transmission and the PDSCH. FIG. 5 illustrates an example of a base station 502 transmitting an indication 510 of the EIRP relationship to the UE 504. The EIRP relationship may be indicated to the UE in RRC signaling. The EIRP relationship may include a dynamic value that is indicated to the UE in DCI. The base station may provide the indication of the EIRP relationship between the first transmission and the PDSCH that enables the UE to set automatic gain control based on the indication of the EIRP relationship.

At 610, the base station transmits the PDSCH to the UE using a second directional beam. The first transmission and the PDSCH may be transmitted in FR1, and the first directional beam may be wider than the second directional beam, e.g., as illustrated in the example in FIG. 4.

In an example, the first transmission may comprise an SSB, and the EIRP relationship indicated at 608 may include an EIRP ratio between the SSB and the PDSCH and/or an EIRP offset between the SSB and the PDSCH.

In another example, the first transmission may comprise a TRS, and the EIRP relationship may include an EIRP ratio between the TRS and the PDSCH or an EIRP offset between the TRS and the PDSCH.

In another example, the first transmission may comprise a prior PDSCH transmission, and the EIRP relationship includes an EIRP ratio between the prior PDSCH transmission and the PDSCH or an EIRP offset between the prior PDSCH transmission and the PDSCH.

In another example, the first transmission may comprise a CSI-RS, and the EIRP relationship may include an EIRP ratio between the CSI-RS and the PDSCH or an EIRP offset between the CSI-RS and the PDSCH.

Figure 7:
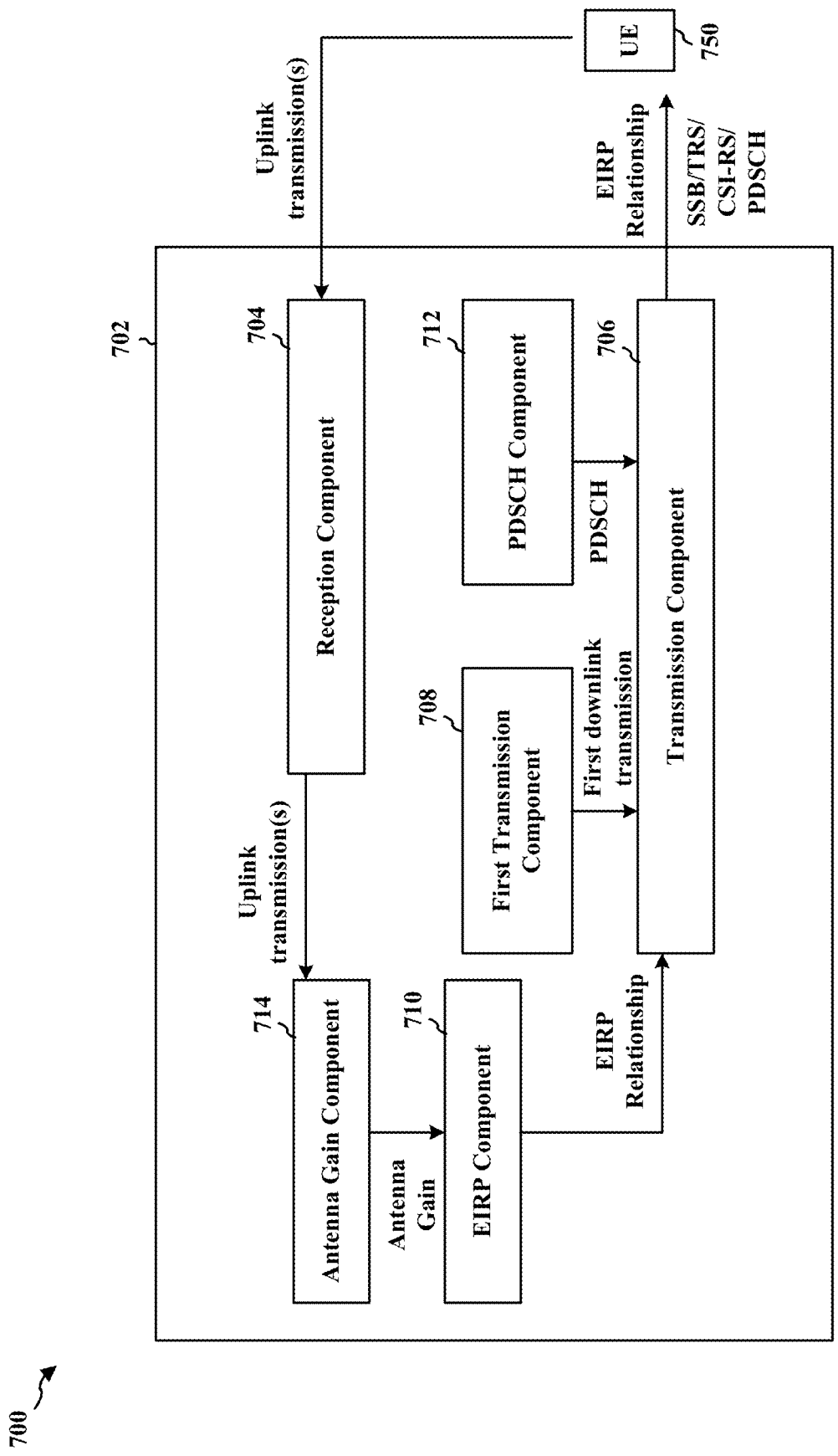
FIG. 7 is a conceptual data flow diagram illustrating the data flow between different means/components in an example apparatus, according to some aspects of the present disclosure.

FIG. 7 is a conceptual data flow diagram 700 illustrating the data flow between different means/components in an example apparatus 702. The apparatus may be a base station or a component of a base station. The apparatus includes a reception component 704 that receives uplink communication from the UE 750 and a transmission component 706 that transmits downlink communication to the UE 750. The apparatus includes a first transmission component 708 configured to transmit a first transmission using a first directional beam (e.g., as described in connection with 602 in FIG. 6). The apparatus may include an EIRP component 710 configured to determine an EIRP relationship between the first transmission and a PDSCH for a UE (e.g., as described in connection with 606 in FIG. 6). The EIRP component 710 and/or the transmission component 706 may be configured to transmit, to the UE, an indication of the EIRP relationship between the first transmission and the PDSCH (e.g., as described in connection with 608 in FIG. 6). The apparatus may include a PDSCH component 712 configured to transmit the PDSCH to the UE using a second directional beam, e.g., via the transmission component 706 (e.g., as described in connection with 610 in FIG. 6). The apparatus may include an antenna gain component 714 configured to determine an antenna gain value for the UE for reception of the PDSCH, where the EIRP relationship is determined based on the antenna gain value of the base station, a first transmission power for the first transmission, and a second transmission power for the PDSCH (e.g., as described in connection with 604 in FIG. 6).

The apparatus may include additional components that perform each of the blocks of the algorithm in the aforementioned flowchart of FIG. 6, and the aspects performed by the base station in FIG. 5. As such, each block in the aforementioned flowchart of FIG. 6, and the aspects performed by the base station in FIG. 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
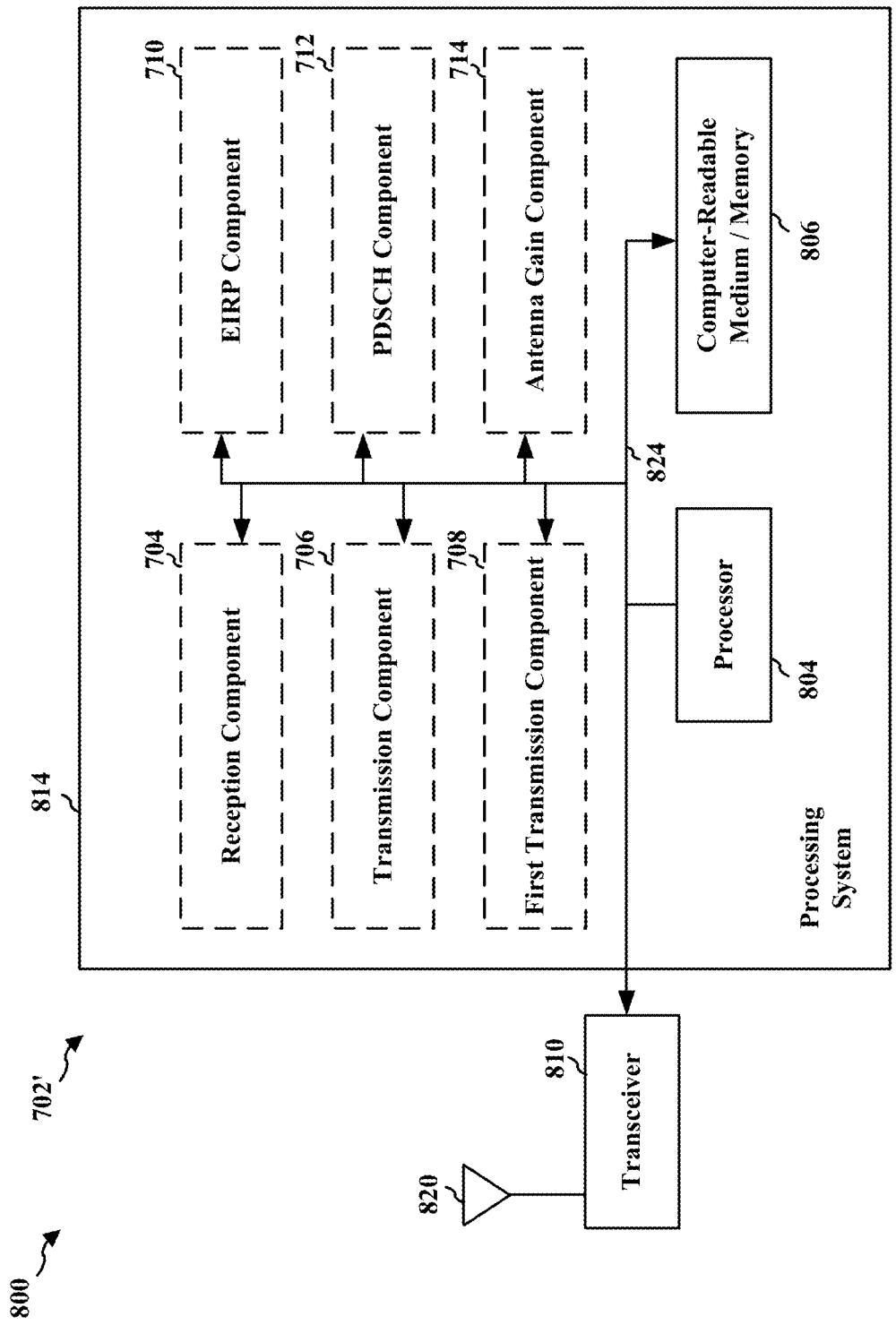
FIG. 8 is a diagram illustrating an example of a hardware implementation for an apparatus employing a processing system, according to some aspects of the present disclosure.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. The processing system 814 may be a component of the base station 310 and may include the memory 376 and/or at least one of the TX processor 316, the RX processor 370, and the controller/processor 375. Alternatively, the processing system 814 may be the entire base station (e.g., see 310 of FIG. 3).

In one configuration, the apparatus 702/702' for wireless communication includes means for transmitting a first transmission using a first directional beam (e.g., the transmission component 706 and/or the first transmission component 708). The apparatus 702/702' may include means for determining an EIRP relationship between the first transmission and a PDSCH for a UE (e.g., the EIRP component 710). The apparatus 702/702' may include means for transmitting, to the UE, an indication of the EIRP relationship between the first transmission and the PDSCH (e.g., the EIRP component 710 and/or transmission component 706). The apparatus 702/702' may include means for transmitting the PDSCH to the UE using a second directional beam (e.g., the PDSCH component 712 and/or the transmission component 706). The apparatus 702/702' may include means for determining an antenna gain value for the UE for reception of the PDSCH, where the EIRP relationship is determined based on the antenna gain value of the base station, a first transmission power for the first transmission, and a second transmission power for the PDSCH (e.g., the antenna gain component 714). The aforementioned means may be one or more of the aforementioned components of the apparatus 702 and/or the processing system 814 of the apparatus 702' configured to perform the functions recited by the aforementioned means. As described supra, the processing system 814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 9:
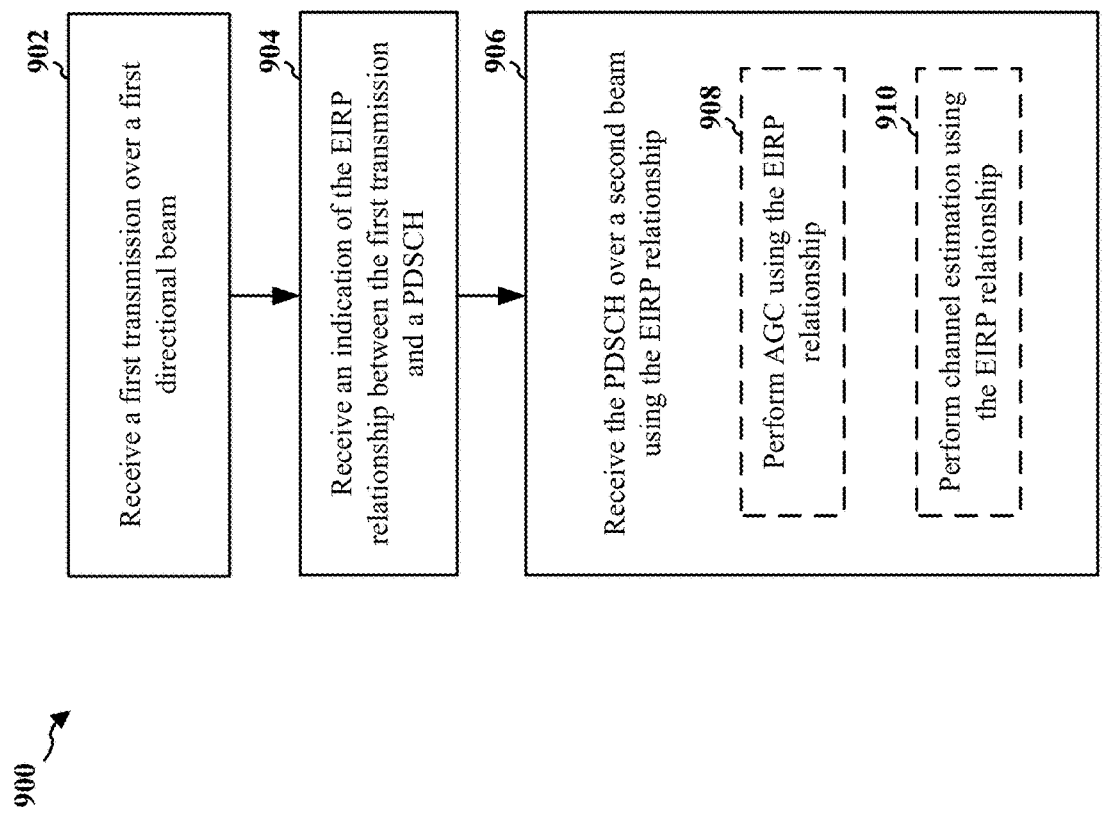
FIG. 9 is a flowchart of a method of wireless communication at a UE including receiving signaling regarding an EIRP relationship between a first downlink transmission and a PDSCH for the UE, according to some aspects of the present disclosure.

FIG. 9 is a flowchart 900 of a method of wireless communication. The method may be performed by a UE or a component of a UE (e.g., the UE 104, 350, 404, 504; the apparatus 1002/1002'; the processing system 1114, which may include the memory 360 and which may be the entire UE 350 or a component of the UE 350, such as the TX processor 368, the RX processor 356, and/or the controller/processor 359).

At 902, the UE receives a first transmission from a base station over a first directional beam. The first transmission may correspond, e.g., to the first downlink transmission 506 in FIG. 5. The first transmission may include an SSB. The first transmission may include a TRS. The first transmission may include CSI-RS. The first transmission may include a first PDSCH.

At 904, the UE receives, from the base station, an indication of an EIRP relationship between the first transmission and a PDSCH. The EIRP relationship may include a dynamic EIRP ratio between the first transmission and the PDSCH that is received in DCI. The EIRP relationship may include a dynamic EIRP ratio between the first transmission and the PDSCH that is received in a payload of a previous PDSCH. The EIRP relationship may include a maximum EIRP ratio between the first transmission and the PDSCH or a maximum EIRP offset between the first transmission and the PDSCH that is received in a RRC message.

The EIRP relationship may be based on an antenna gain value of the base station used for transmission to the UE, a first transmission power for the first transmission and a second transmission power for the PDSCH, e.g., as described in connection with 604 and 606 of FIG. 6, and as described in connection with FIG. 5. The EIRP relationship may be based, at least in part, on the antenna gain value of the base station (e.g., the antenna gain for the base station used for the transmission for the UE). For example, the EIRP relationship may be based on the antenna gain value, a first transmission power for the first transmission, and a second transmission power for the PDSCH. For example, the base station may determine the antenna gain value based on a precoding selected for the PDSCH. The base station may determine the antenna gain value based on an antenna beam pattern used in a transmission for the UE. The base station may determine the antenna gain value based on uplink channel measurements for communication from the UE. The base station may determine the antenna gain value based on an estimated pathloss for the UE. The base station may determine the antenna gain value based on a combination of precoding, antenna beam pattern, uplink channel measurements, and/or estimated pathloss.

At 906, the UE receives the PDSCH from the base station over a second directional beam using the EIRP relationship. The PDSCH transmission may correspond, e.g., to the PDSCH transmission 512 in FIG. 5. The first transmission and the PDSCH may be received in FR1, and the first directional beam may be wider than the second directional beam, e.g., as described in connection with FIG. 4. As an example, as illustrated at 908, the UE may perform automatic gain control to receive the PDSCH using the EIRP relationship indicated by the base station. For example, the UE may set the automatic gain control based on the EIRP relationship indicated by the base station. As another example, as illustrated at 910, the UE may perform channel estimation to receive the PDSCH using the EIRP relationship indicated by the base station.

In an example, the first transmission may comprise an SSB, and the EIRP relationship indicated at 608 may include an EIRP ratio between the SSB and the PDSCH and/or an EIRP offset between the SSB and the PDSCH.

In another example, the first transmission may comprise a TRS, and the EIRP relationship may include an EIRP ratio between the TRS and the PDSCH or an EIRP offset between the TRS and the PDSCH.

In another example, the first transmission may comprise a prior PDSCH transmission, and the EIRP relationship may include an EIRP ratio between the prior PDSCH transmission and a future PDSCH or an EIRP offset between the prior PDSCH transmission and a future PDSCH transmission.

In another example, the first transmission may comprise a CSI-RS, and the EIRP relationship may include an EIRP ratio between the CSI-RS and the PDSCH or an EIRP offset between the CSI-RS and the PDSCH.

Figure 10:
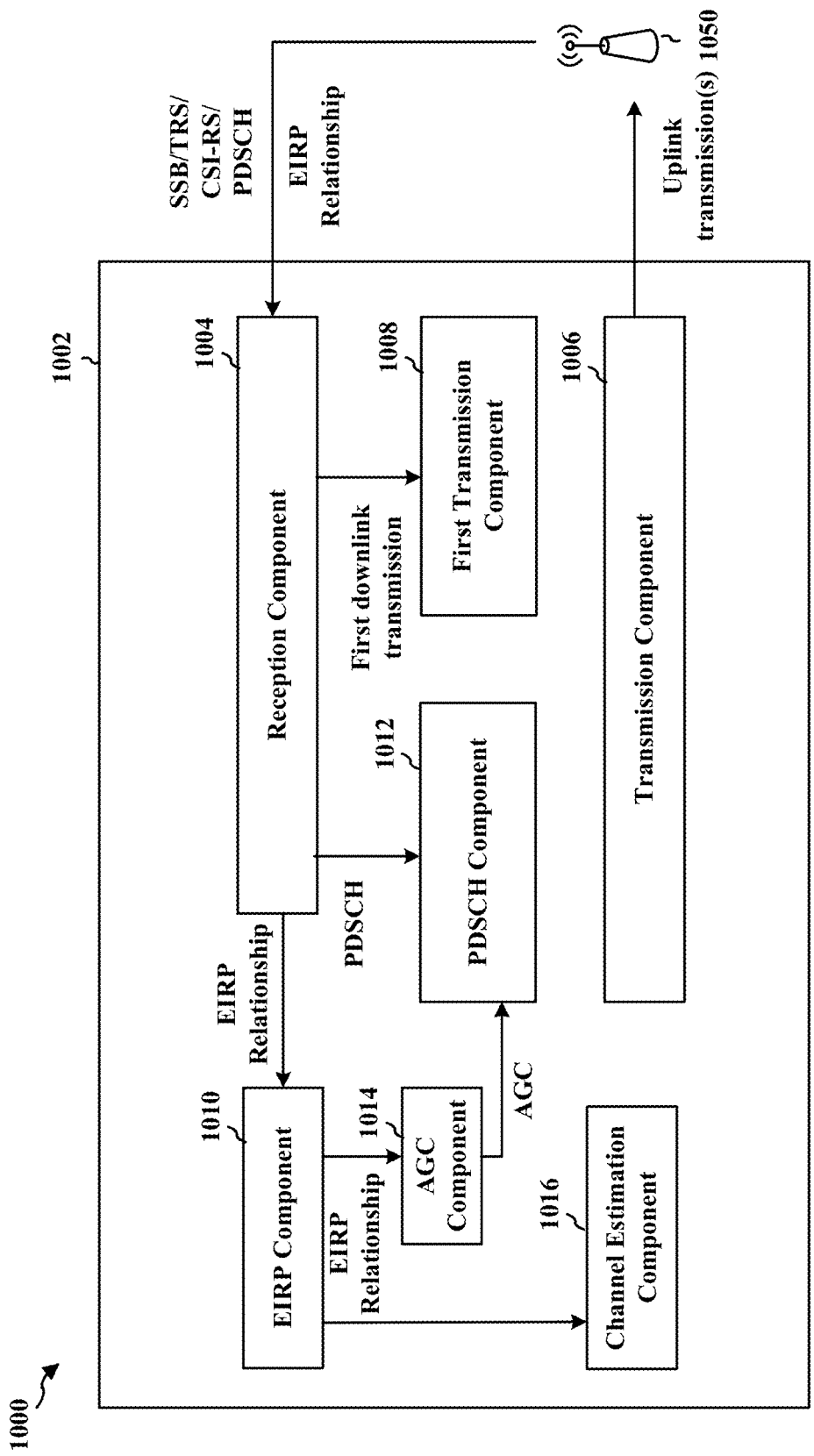
FIG. 10 is a conceptual data flow diagram illustrating the data flow between different means/components in an example apparatus, according to some aspects of the present disclosure.

FIG. 10 is a conceptual data flow diagram 1000 illustrating the data flow between different means/components in an example apparatus 1002. The apparatus may be a UE or a component of a UE. The apparatus includes a reception component 1004 that receives downlink communication from the base station 1050 and a transmission component 1006 that transmits uplink communication to the base station 1050. The apparatus includes a first transmission component 1008 configured to receive a first transmission from a base station over a first directional beam (e.g., as described in connection with 902 in FIG. 9). The apparatus includes an EIRP component 1010 configured to receive, from the base station, an indication of an EIRP relationship between the first transmission and a PDSCH (e.g., as described in connection with 904 in FIG. 9). The apparatus includes a PDSCH component 1012 configured to receive the PDSCH from the base station over a second directional beam using the EIRP relationship (e.g., as described in connection with 906 in FIG. 9). The apparatus may include an AGC component 1014 perform automatic gain control to receive the PDSCH using the EIRP relationship indicated by the base station (e.g., as described in connection with 908 in FIG. 9). The apparatus may include a channel estimation component 1016 configured to perform channel estimation to receive the PDSCH using the EIRP relationship indicated by the base station (e.g., as described in connection with 910 in FIG. 9).

The apparatus may include additional components that perform each of the blocks of the algorithm in the aforementioned flowchart of FIG. 9, and the aspects performed by UE 504 in FIG. 5. As such, each block in the aforementioned flowchart of FIG. 9, and the aspects performed by UE 504 in FIG. 5, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
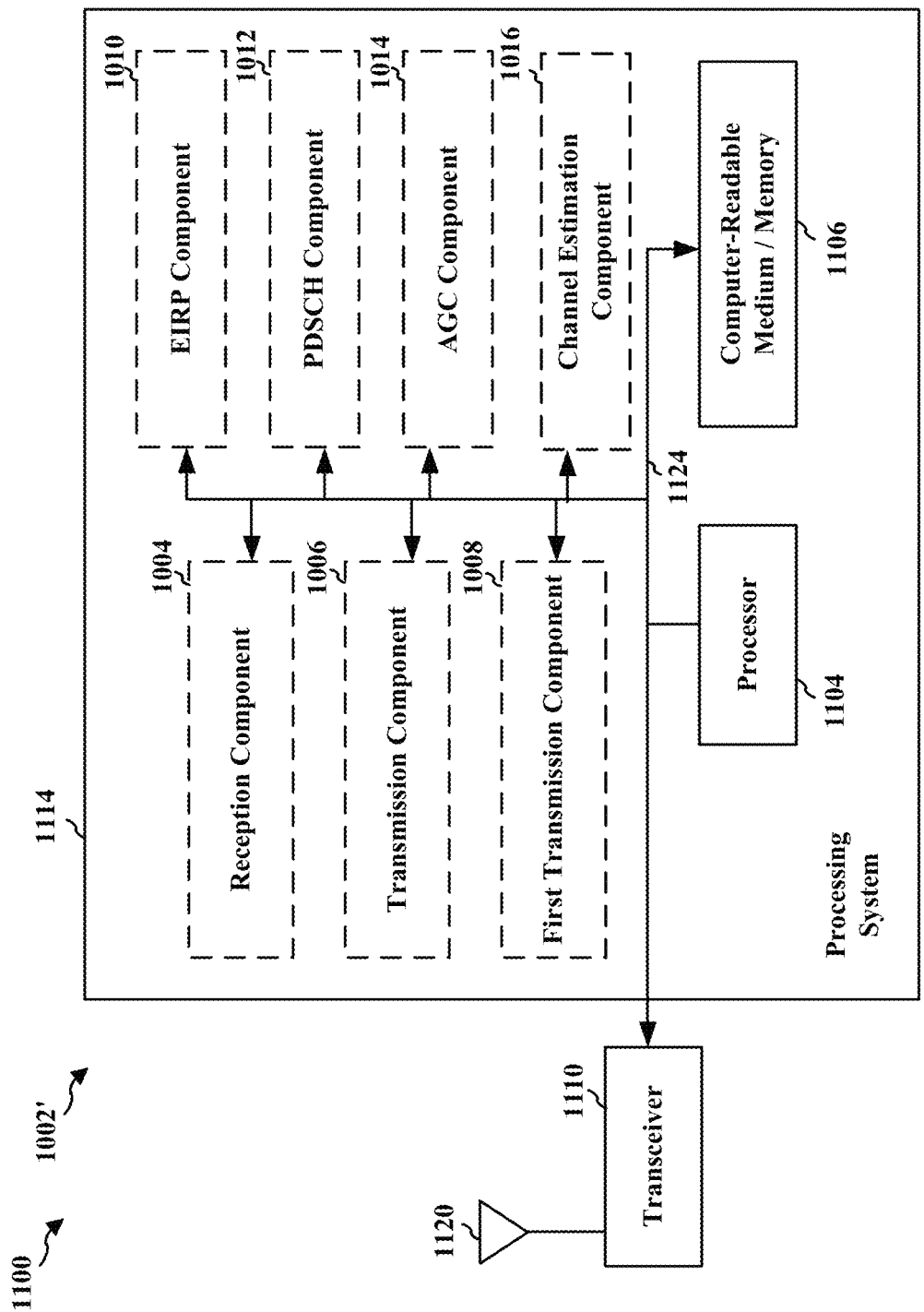
FIG. 11 is a diagram illustrating an example of a hardware implementation for an apparatus employing a processing system, according to some aspects of the present disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see 350 of FIG. 3).

In one configuration, the apparatus 1002/1002' for wireless communication includes means for receiving a first transmission from a base station over a first directional beam (e.g., the reception component 1004 and/or the first transmission component 1008). The apparatus 1002/1002' may include means for receiving, from the base station, an indication of an EIRP relationship between the first transmission and a PDSCH (e.g., the reception component 1004 and/or the EIRP component 1010). The apparatus 1002/1002' may include means for receiving the PDSCH from the base station over a second directional beam using the EIRP relationship (e.g., the reception component 1004 and/or the PDSCH component 1012). The apparatus 1002/1002' may include means for performing automatic gain control to receive the PDSCH using the EIRP relationship indicated by the base station (e.g., the AGC component 1014). The apparatus 1002/1002' may include means for performing channel estimation to receive the PDSCH using the EIRP relationship indicated by the base station (e.g., the channel estimation component 1016). The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Example 1 is a method of wireless communication at a base station, comprising: transmitting a first transmission using a first directional beam; determining an EIRP relationship between the first transmission and a PDSCH for a UE; transmitting, to the UE, an indication of the EIRP relationship between the first transmission and the PDSCH; and transmitting the PDSCH to the UE using a second directional beam.

In Example 2, the method of Example 1 further comprises determining an antenna gain value for the UE for reception of the PDSCH, wherein the EIRP relationship is determined based on the antenna gain value of the base station, a first transmission power for the first transmission, and a second transmission power for the PDSCH.

In Example 3, the method of Example 1 or Example 2 further comprises that the base station determines the antenna gain value based on at least one of: a precoding selected for the PDSCH, an antenna beam pattern used in a transmission for the UE, an estimated pathloss for the UE, or uplink channel measurements for communication from the UE.

In Example 4, the method of any of Examples 1-3 further includes that the first transmission and the PDSCH are transmitted in FR1, and wherein the first directional beam is wider than the second directional beam.

In Example 5, the method of any of Examples 1-4 further includes that the first transmission comprises a synchronization signal block (SSB), and the EIRP relationship includes an EIRP ratio between the SSB and the PDSCH or an EIRP offset between the SSB and the PDSCH.

In Example 6, the method of any of Examples 1-5 further includes that the first transmission comprises a tracking reference signal (TRS), and the EIRP relationship includes an EIRP ratio between the TRS and the PDSCH or an EIRP offset between the TRS and the PDSCH.

In Example 7, the method of any of Examples 1-6 further includes that the first transmission comprises a prior PDSCH transmission, and the EIRP relationship includes an EIRP ratio between the prior PDSCH transmission and the PDSCH or an EIRP offset between the prior PDSCH transmission and the PDSCH.

In Example 8, the method of any of Examples 1-7 further includes that the first transmission comprises a CSI-RS, and the EIRP relationship includes an EIRP ratio between the CSI-RS and the PDSCH or an EIRP offset between the CSI-RS and the PDSCH.

In Example 9, the method of any of Examples 1-8 further includes that the EIRP relationship includes a dynamic EIRP ratio between the first transmission and the PDSCH that is indicated in DCI.

In Example 10, the method of any of Examples 1-9 further includes that the EIRP relationship includes a dynamic EIRP ratio between the first transmission and the PDSCH that is indicated in a payload of a previous PDSCH.

In Example 11, the method of any of Examples 1-10 further includes that the EIRP relationship includes a maximum EIRP ratio between the first transmission and the PDSCH or a maximum EIRP offset between the first transmission and the PDSCH that is indicated in a RRC message.

In Example 12, the method of any of Examples 1-11 further includes that the base station provides the indication of the EIRP relationship between the first transmission and the PDSCH that enables the UE to set automatic gain control based on the indication of the EIRP relationship.

Example 13 is a device including one or more processors and one or more memories in electronic communication with the one or more processors storing instructions executable by the one or more processors to cause the device to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a wireless communication at a UE, comprising: receiving a first transmission from a base station over a first directional beam; receiving, from the base station, an indication of an EIRP relationship between the first transmission and a PDSCH; and receiving the PDSCH from the base station over a second directional beam using the EIRP relationship.

In Example 17, the method of Example 16 further includes performing automatic gain control to receive the PDSCH using the EIRP relationship indicated by the base station.

In Example 18, the method of Example 16 or 17 further includes that the UE sets the automatic gain control based on the EIRP relationship indicated by the base station.

In Example 19, the method of any of Examples 16-18 further include performing channel estimation to receive the PDSCH using the EIRP relationship indicated by the base station.

In Example 20, the method of any of Examples 16-19 further include that the EIRP relationship is based on an antenna gain value of the base station used for transmission to the UE, a first transmission power for the first transmission and a second transmission power for the PDSCH.

In Example 21, the method of any of Examples 16-20 further include that the antenna gain value is based on at least one of: a precoding for the PDSCH, an antenna beam pattern used in a transmission for the UE, an estimated pathloss for communication with the UE, or uplink channel measurements for the UE.

In Example 22, the method of any of Examples 16-21 further include that the first transmission and the PDSCH are received in FR1, and wherein the first directional beam is wider than the second directional beam.

In Example 23, the method of any of Examples 16-22 further include that the first transmission comprises an SSB, and the EIRP relationship includes an EIRP ratio between the SSB and the PDSCH or an EIRP offset between the SSB and the PDSCH.

In Example 24, the method of any of Examples 16-23 further include that the first transmission comprises a TRS, and the EIRP relationship includes an EIRP ratio between the TRS and the PDSCH or an EIRP offset between the TRS and the PDSCH.

In Example 25, the method of any of Examples 16-24 further include that the first transmission comprises a prior PDSCH transmission, and the EIRP relationship includes an EIRP ratio between the prior PDSCH transmission and the PDSCH or an EIRP offset between the prior PDSCH transmission and the PDSCH.

In Example 26, the method of any of Examples 16-25 further include that the first transmission comprises a CSI-RS, and the EIRP relationship includes an EIRP ratio between the CSI-RS and the PDSCH or an EIRP offset between the CSI-RS and the PDSCH.

In Example 27, the method of any of Examples 16-26 further include that the EIRP relationship includes a dynamic EIRP ratio between the first transmission and the PDSCH that is received in DCI.

In Example 28, the method of any of Examples 16-27 further include that the EIRP relationship includes a dynamic EIRP ratio between the first transmission and the PDSCH that is received in a payload of a previous PDSCH.

In Example 29, the method of any of Examples 16-28 further include that the EIRP relationship includes a maximum EIRP ratio between the first transmission and the PDSCH or a maximum EIRP offset between the first transmission and the PDSCH that is received in a RRC message.

Example 30 is a device including one or more processors and one or more memories in electronic communication with the one or more processors storing instructions executable by the one or more processors to cause the device to implement a method as in any of Examples 16-29.

Example 31 is a system or apparatus including means for implementing a method or realizing an apparatus as in any of Examples 16-29.

Example 32 is a non-transitory computer readable medium storing instructions executable by one or more processors to cause the one or more processors to implement a method as in any of Examples 16-29.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
 transmitting a first transmission using a first directional beam;
 determining an equivalent isotropic radiated power (EIRP) relationship between the first transmission and a physical downlink shared channel (PDSCH) for a user equipment (UE);
 transmitting, to the UE, an indication of the EIRP relationship between the first transmission and the PDSCH; and
 transmitting the PDSCH to the UE using a second directional beam.

2. The method of claim 1, further comprising:
 determining an antenna gain value for the UE for reception of the PDSCH, wherein the EIRP relationship is determined based on the antenna gain value of the base station, a first transmission power for the first transmission, and a second transmission power for the PDSCH.

3. The method of claim 2, wherein the base station determines the antenna gain value based on at least one of:
 a precoding selected for the PDSCH,
 an antenna beam pattern used in a transmission for the UE,
 an estimated pathloss for the UE, or
 uplink channel measurements for communication from the UE.

4. The method of claim 1, wherein the first transmission and the PDSCH are transmitted in Frequency Range 1 (FR1), and wherein the first directional beam is wider than the second directional beam.

5. The method of claim 1, wherein the first transmission comprises a synchronization signal block (SSB), and the EIRP relationship includes an EIRP ratio between the SSB and the PDSCH or an EIRP offset between the SSB and the PDSCH.

6. The method of claim 1, wherein the first transmission comprises a tracking reference signal (TRS), and the EIRP relationship includes an EIRP ratio between the TRS and the PDSCH or an EIRP offset between the TRS and the PDSCH.

7. The method of claim 1, wherein the first transmission comprises a prior PDSCH transmission, and the EIRP relationship includes an EIRP ratio between the prior PDSCH transmission and the PDSCH or an EIRP offset between the prior PDSCH transmission and the PDSCH.

8. The method of claim 1, wherein the first transmission comprises a channel state information reference signal (CSI-RS), and the EIRP relationship includes an EIRP ratio between the CSI-RS and the PDSCH or an EIRP offset between the CSI-RS and the PDSCH.

9. The method of claim 1, wherein the EIRP relationship includes a dynamic EIRP ratio between the first transmission and the PDSCH that is indicated in downlink control information (DCI).

10. The method of claim 1, wherein the EIRP relationship includes a dynamic EIRP ratio between the first transmission and the PDSCH that is indicated in a payload of a previous PDSCH.

11. The method of claim 1, wherein the EIRP relationship includes a maximum EIRP ratio between the first transmission and the PDSCH or a maximum EIRP offset between the first transmission and the PDSCH that is indicated in a radio resource control (RRC) message.

12. The method of claim 1, wherein the base station provides the indication of the EIRP relationship between the first transmission and the PDSCH that enables the UE to set automatic gain control based on the indication of the EIRP relationship.

13. An apparatus for wireless communication at a base station, comprising:
 a memory; and
 at least one processor coupled to the memory, the memory and the at least one processor configured to:
  transmit a first transmission using a first directional beam;
  determine an equivalent isotropic radiated power (EIRP) relationship between the first transmission and a physical downlink shared channel (PDSCH) for a user equipment (UE);
  transmit, to the UE, an indication of the EIRP relationship between the first transmission and the PDSCH; and
  transmit the PDSCH to the UE using a second directional beam.

14. The apparatus of claim 13, wherein the memory and the at least one processor are further configured to:
 determine an antenna gain value for the transmission of the PDSCH to the UE, wherein the EIRP relationship is determined based on the antenna gain value of the base station, a first transmission power for the first transmission, and a second transmission power for the PDSCH.

* * * * *